United States Patent
Sternerson

(10) Patent No.: US 7,839,887 B1
(45) Date of Patent: Nov. 23, 2010

(54) METHOD AND SYSTEM FOR PROVIDING FRAME RATE ADAPTION

(75) Inventor: Hannes Sternerson, Oakland, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 1287 days.

(21) Appl. No.: 10/811,227

(22) Filed: Mar. 26, 2004

Related U.S. Application Data

(60) Provisional application No. 60/512,386, filed on Oct. 16, 2003.

(51) Int. Cl.
   *H04J 3/07* (2006.01)
(52) U.S. Cl. ............................. 370/466; 370/470
(58) Field of Classification Search .......... 370/352, 370/353, 466, 470, 401, 402
   See application file for complete search history.

(56) References Cited

U.S. PATENT DOCUMENTS

| | | | | |
|---|---|---|---|---|
| 5,642,357 | A * | 6/1997 | Suzuki et al. | 370/505 |
| 6,052,368 | A * | 4/2000 | Aybay | 370/357 |
| 6,141,341 | A * | 10/2000 | Jones et al. | 370/352 |
| 6,259,695 | B1 * | 7/2001 | Ofek | 370/389 |
| 6,611,694 | B1 * | 8/2003 | Oltedal et al. | 455/560 |
| 6,658,027 | B1 * | 12/2003 | Kramer et al. | 370/516 |
| 6,693,921 | B1 * | 2/2004 | Whitfield | 370/516 |
| 6,721,712 | B1 * | 4/2004 | Benyassine et al. | 704/503 |
| 6,735,199 | B1 * | 5/2004 | Ofek | 370/389 |
| 6,847,313 | B2 * | 1/2005 | Biswas | 341/61 |
| 6,856,613 | B1 * | 2/2005 | Murphy | 370/352 |
| 6,996,059 | B1 * | 2/2006 | Tonogai | 370/230 |
| 7,096,274 | B1 * | 8/2006 | Ci et al. | 709/236 |
| 7,167,451 | B1 * | 1/2007 | Oran | 370/252 |
| 7,444,281 | B2 * | 10/2008 | Sundqvist et al. | 704/201 |
| 2002/0037002 | A1 * | 3/2002 | Mizusawa et al. | 370/352 |
| 2002/0041570 | A1 * | 4/2002 | Ptasinski et al. | 370/252 |
| 2002/0114320 | A1 * | 8/2002 | Ogren | 370/352 |
| 2002/0114321 | A1 * | 8/2002 | Ogren | 370/352 |
| 2003/0152093 | A1 * | 8/2003 | Gupta et al. | 370/412 |
| 2004/0156624 | A1 * | 8/2004 | Kent et al. | 386/125 |
| 2004/0160979 | A1 * | 8/2004 | Pepin et al. | 370/462 |
| 2004/0263363 | A1 * | 12/2004 | Biswas | 341/61 |

* cited by examiner

*Primary Examiner*—Ricky Ngo
*Assistant Examiner*—Ben H Liu
(74) *Attorney, Agent, or Firm*—Townsend and Townsend and Crew LLP

(57) ABSTRACT

A system for providing frame rate conversion for audio data is provided. The system includes a first client configured to transmit audio data frames at a first frame rate, a second client configured to receive audio data frames at a second frame rate. The first frame rate is different from the second frame rate. The system further includes a device configured to facilitate transmission of audio data frames between the first client and the second client. The device is further configured to receive the audio data frames from the first client at the first frame rate, store the received audio data frames in an intermediate storage area and repackage the stored audio data frames into one or more frames for transmission to the second client at the second frame rate.

19 Claims, 1 Drawing Sheet

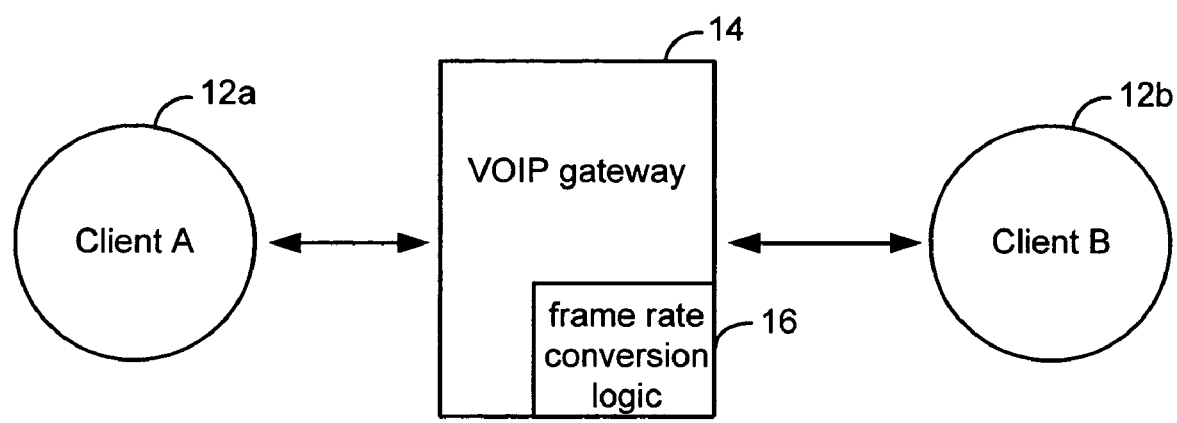

METHOD AND SYSTEM FOR PROVIDING FRAME RATE ADAPTION

CROSS-REFERENCES TO RELATED APPLICATION(S)

The present application claims the benefit of priority under 35 U.S.C. §119 from U.S. Provisional Patent Application Ser. No. 60/512,386, entitled "FRAME RATE ADAPTION" filed on Oct. 16, 2003, the disclosure of which is hereby incorporated by reference in its entirety for all purposes.

BACKGROUND OF THE INVENTION

The present invention generally relates to Voice-over-IP (VoIP) and, more specifically, to a method and system for handling and adapting varying frame rates in audio communications.

VoIP calls transfer audio data across an IP (Internet Protocol) network as audio frames, each frame containing a specific amount of audio data. Currently, there are various standards that can be used to encode audio data in a frame. Some of these standards vary with respect to how much audio data is to be included in a frame. As a result, for equipment supporting different frame sizes to be able to communicate with each other, conversion of frame rates has to be carried out.

For example, phone A may be only capable of handling 20 ms of audio data per frame, while phone B may be only capable of handling 30 ms of audio data per frame. This is a common incompatibility issue when using the voice codec G.711. Because of the incompatibility between the two phones, these two phones cannot transfer audio data directly between them. Even if a VoIP gateway is used to facilitate communications between the two phones, the VoIP gateway has to adapt the different frame rates to match the phones' respective requirements.

Hence, it would be desirable to develop a method and system that is capable of solving the foregoing problem, as well as others, by providing the capability to adapt varying frames rates in audio data communications.

BRIEF SUMMARY OF THE INVENTION

A system for providing frame rate conversion for audio data is provided. In one embodiment, the system includes a first client configured to transmit audio data frames at a first frame rate, a second client configured to receive audio data frames at a second frame rate. The first frame rate is different from the second frame rate. The system further includes a device configured to facilitate transmission of audio data frames between the first client and the second client. The device is further configured to receive the audio data frames from the first client at the first frame rate, store the received audio data frames in an intermediate storage area and repackage the stored audio data frames into one or more frames for transmission to the second client at the second frame rate.

In one implementation, the system is implemented in software, hardware or a combination of both and the system is incorporated into a Voice-over-IP gateway.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

FIG. 1 is a simplified block diagram illustrating an exemplary embodiment of the present invention.

DETAILED DESCRIPTION OF THE INVENTION

The present invention in the form of one or more exemplary embodiments will now be described. In one exemplary aspect of the present invention, conversion or translation of varying frame rates can be achieved through the use of local storage of the audio data. Frame rate conversion can be carried out by using intermediate storage for the audio data. Inbound data is added to the intermediate storage. As soon as there is enough data to compose an outbound frame, data is transmitted from the intermediate storage. This way, any inbound frame size can be adapted to any outbound frame size.

FIG. 1 is a simplified block diagram illustrating an embodiment of the present invention. In one embodiment, the system 10 includes a number of clients 12 and a VoIP gateway 14 having frame rate conversion logic 16. Audio data is exchanged between clients 12a and 12b via the VoIP gateway 14. Clients 12a and 12b can be any type of equipment that is capable of handling audio data including, for example, telephones and personal computers. The frame rate conversion logic 16 allows the clients 12a and 12b to use different standards or protocols to transmit or receive audio data.

For example, assume that client 12a uses a first protocol which allows transmission of a frame having 20 ms of audio data and client 12b uses a second protocol which allows reception of a frame having 100 ms of audio data. Client 12a wishes to transmit certain audio data to client 12b. The frame rate conversion logic 16 is aware of the respective protocols being used by the clients 12a and 12b. Since a frame from client 12a contains less audio data than a frame that can be handled by client 12b, the frame rate conversion logic 16 first stores a number of frames from client 12a in an intermediate storage area until sufficient audio data for a frame is collected for transmission to client 12b. In this example, once five (5) frames from client 12a have been stored, audio data from these frames is transmitted as a single frame to client 12b.

In a reverse scenario where client 12b wishes to send audio data to client 12a, the frame rate conversion logic 16 breaks up a frame from client 12b into smaller frames, in this case, five (5) frames, and transmits these frames to client 12a.

In a more general situation, the frame rate of client 12a does not factor into the frame rate of client 12b as an integer. In that case, once the frame rate conversion logic 16 collects sufficient data from client 12a to form an outbound frame for client 12b, the outbound frame is sent to client 12b and any excess data is stored for use in the next outbound frame. For example, assuming client 12a accommodates a frame having 30 ms of audio data and client 12b accommodates a frame of 40 ms of audio data. Once two (2) frames from client 12a totaling 60 ms of audio data are received, one (1) outbound frame having 40 ms of audio data is sent to client 12b. The remaining 20 ms of audio data is stored in a temporary storage area. When the next frame from client 12a is received, 50 ms of audio data is now available (20 ms from temporary storage area and 30 ms from client 12a frame). Another outbound frame is sent to client 12b. The remaining 10 ms of audio data is then put into the temporary storage area. In this manner, once an outbound frame is filled up, it is sent to client 12b.

It should be understood that frame rate and frame size are merely different ways or metrics used to describe a frame. In addition, as frame size directly corresponds to frame length, this can also be referred to as frame length adaption. An increase in frame rate is the same as a decrease in frame length, i.e., the amount of audio data in each frame.

In one embodiment, the frame rate conversion logic 16 is shown as residing on the VoIP gateway 14. Based on the disclosure and teachings provided herein, it should be understood that the frame rate conversion logic 16 can reside on any type of equipment that serves as an intermediary between two devices transmitting and/or receiving audio data. The present invention can be incorporated or integrated into various components of a computer network. In an alternative embodiment, the present invention is integrated into traffic aggregation equipment, such as, an intelligent bandwidth manager. Based on the disclosure and teachings provided herein, a person of ordinary skill in the art will know of various ways and/or methods to deploy the present invention.

In an exemplary implementation, the present invention is implemented using software in the form of control logic, in either an integrated or a modular manner. Alternatively, hardware or a combination of software and hardware can also be used to implement the present invention. Based on the disclosure and teachings provided herein, a person of ordinary skill in the art will know of other ways and/or methods to implement the present invention.

While the above description is provided in the context of VoIP, it should be understood that the present invention can be deployed in various applications involving different kinds of data having different data sizes or frame lengths. Based on the disclosure and teachings provided herein, a person of ordinary skill in the art will appreciate how to deploy the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system for providing frame rate conversion for audio data, comprising:
   a first client configured to transmit audio data frames at a first frame rate using a first protocol;
   a second client configured to receive audio data frames at a second frame rate using a second protocol, wherein the first frame rate is different from the second frame rate; and
   a voice-over-IP (VoIP) gateway device configured to facilitate transmission of audio data frames between the first client and the second client in the respective first and second protocols, wherein the VoIP gateway device is configured to:
   store the audio data frames received from the first client in an intermediate storage area until at least a data size associated with the second frame rate is received from the first client; and
   repackage the stored audio data frames into one or more frames for transmission to the second client at the second frame rate,
   wherein the audio data frames transmitted at the first frame rate have a first interval between the frames, wherein the audio data frames transmitted at the second frame rate have a second interval between the frame, and wherein the first interval and the second interval are constant, and wherein a total amount of audio data received by the second client in the one or more repackaged frames is equal to a total amount of audio data transmitted by the first client in the audio data frames.

2. The system of claim 1 wherein the device is further configured to receive the audio data frames from the first client at the first frame rate and convert the audio data frames for transmission to the second client at the second frame rate.

3. The system of claim 1 wherein the system is implemented in software, hardware or a combination of both.

4. The system of claim 1 wherein the first client and the second client include telephonic equipment and computers.

5. A Voice-over-IP gateway incorporating the system as recited in claim 1.

6. A Voice-over-IP device for facilitating communications between a first client and a second client, the device comprising:
   control logic configured to receive audio data frames from the first client at a first frame rate using a first protocol;
   control logic to store the audio data frames from the first client in an intermediate storage area until at least a data size associated with a second frame rate is received from the first client;
   control logic to repackage the stored audio data frames into one or more frames for transmission to the second client at the second frame rate;
   control logic configured to transmit using a second protocol the one or more frames into which the stored audio data frames were repackaged to the second client at the second frame rate;
   wherein the first frame rate is different from the second frame rate, wherein the audio data frames transmitted at the first frame rate have a first interval between the frames, wherein the audio data frames transmitted at the second frame rate have a second interval between the frame, and wherein the first interval and the second interval are constant, and wherein a total amount of audio data received by the second client in the one or more repackaged frames is equal to a total amount of audio data transmitted by the first client in the audio data frames.

7. The device of claim 6 wherein the control logic is implemented in software, hardware or a combination of both.

8. The device of claim 6 wherein the first client and the second client include telephonic equipment and computers.

9. A system for providing frame rate conversion for audio data, comprising:
   a first client configured to transmit audio data frames at a first frame rate using a first protocol;
   a second client configured to receive audio data frames at a second frame rate using a second protocol, wherein the first frame rate is different from the second frame rate; and
   an intermediate storage area configured to store audio data frames received from the first client until at least a data size associated with the second frame rate is received from the first client;
   a voice-over-IP gateway device configured to repackage the stored audio data frames into one or more frames for transmission to the second client at the second frame rate,
   wherein the audio data frames transmitted at the first frame rate have a first interval between the frames, wherein the audio data frames transmitted at the second frame rate have a second interval between the frame, and wherein the first interval and the second interval are constant, and wherein a total amount of audio data received by the second client in the one or more repackaged frames is equal to a total amount of audio data transmitted by the first client in the audio data frames.

10. The system of claim 9 wherein the system is implemented in software, hardware or a combination of both.

11. The system of claim 9 wherein the first client and the second client include telephonic equipment and computers.

12. A method for providing frame rate conversion for audio data, the method comprising:

receiving audio data frames from a first client at a first frame rate using a first protocol;

storing the received audio data frames in an intermediate storage area until at least a data size associated with a second frame rate is received from the first client;

converting the received audio data frames into one or more frames in a second protocol; and transmitting the one or more frames in the second protocol to a second client at a the second frame rate;

wherein the first frame rate is different from the second frame rate, wherein the audio data frames transmitted at the first frame rate have a first interval between the frames, wherein the audio data frames transmitted at the second frame rate have a second interval between the frame, and wherein the first interval and the second interval are constant, and wherein a total amount of audio data transmitted in the one or more repackaged frames is equal to a total amount of audio data received from the first client.

13. The method of claim 12 wherein the method is implemented using software, hardware or a combination of both.

14. A Voice-over-IP gateway utilizing the method as recited in claim 12.

15. The method of claim 12 wherein the first client and the second client include telephonic equipment and computers.

16. A method for providing frame rate conversion for audio data, the method comprising:

receiving audio data frames from a first client using a first protocol, the audio data frames being received at a first frame rate;

storing the received audio data frames in an intermediate storage area until at least a data size associated with a second frame rate is received from the first client;

repackaging the stored audio data frames into one or more frames according to the data size associated with the second frame rate; and transmitting the one or more frames to a second client at a second frame rate using a second protocol;

wherein the first frame rate is different from the second frame rate, wherein the audio data frames transmitted at the first frame rate have a first interval between the frames, wherein the audio data frames transmitted at the second frame rate have a second interval between the frame, and wherein the first interval and the second interval are constant, and wherein a total amount of audio data transmitted to the second client in the one or more repackaged frames is equal to a total amount of audio data transmitted by the first client in the audio data frames.

17. The method of claim 16 wherein the method is implemented using software, hardware or a combination of both.

18. A Voice-over-IP gateway utilizing the method as recited in claim 16.

19. The method of claim 16 wherein the first client and the second client include telephonic equipment and computers.

* * * * *